Patented Nov. 26, 1935

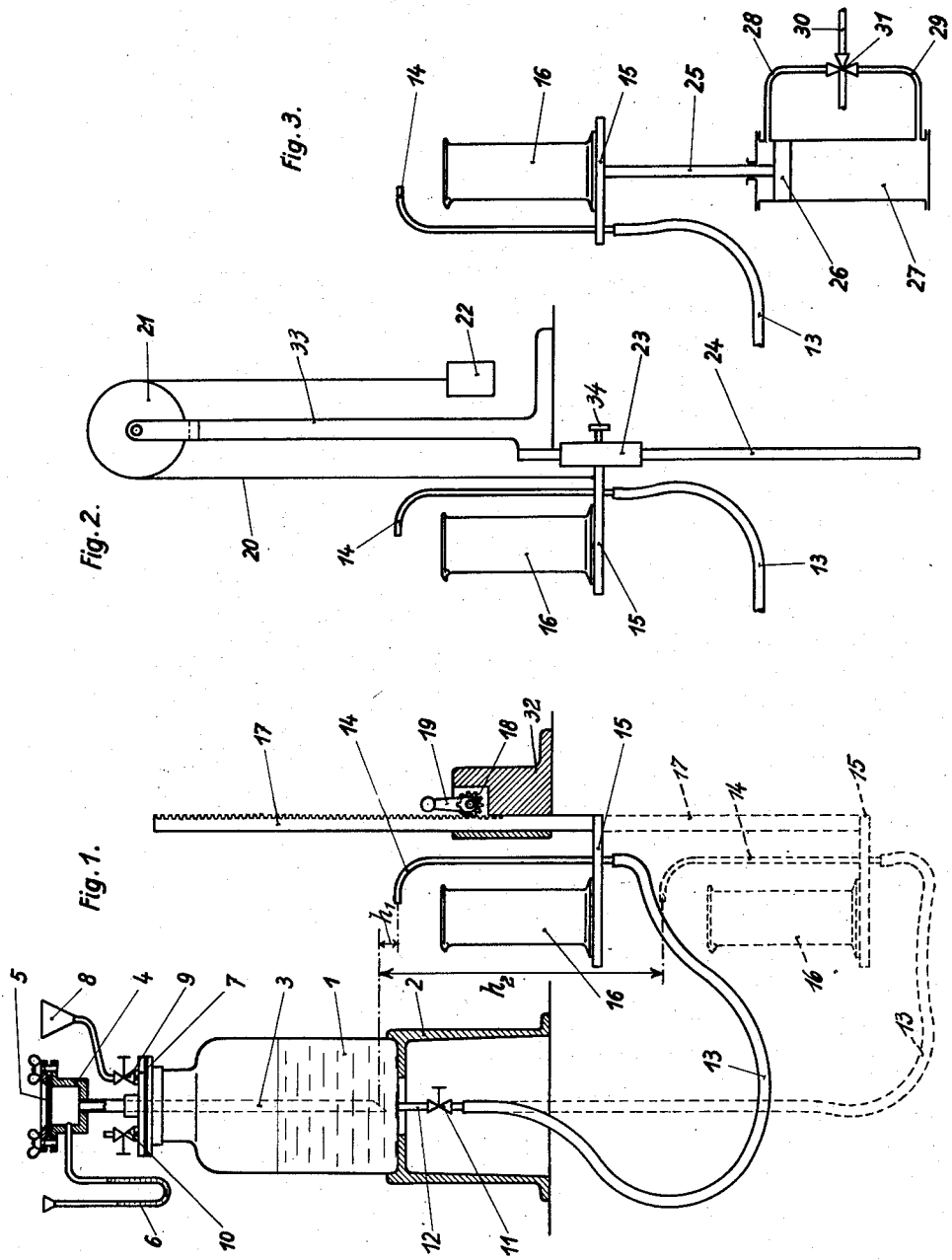

2,021,948

UNITED STATES PATENT OFFICE 2,021,948

APPARATUS FOR TESTING POROUS MATERIALS

Rudolf Schopper, Leipzig, Germany

Application June 22, 1931, Serial No. 546,034
In Germany May 23, 1931

11 Claims. (Cl. 73—51)

My invention relates to means for testing the permeability, for instance, the permeability to air, of porous materials, such as ordinary paper, coarse paper for bags and the like, filtering paper and other materials. It has particular reference to apparatus of the type in which air is sucked through the material under test with constant suction by means of a Mariotte flask.

A Mariotte flask, as is known, is a vessel of glass or other suitable material which has a discharge opening at the bottom and a suction or air-inlet pipe which extends into the vessel from above. The flask is filled with water or other liquid to a level above the lower end of the pipe and the head under which the liquid flows from the discharge opening is equal to the vertical distance of this opening from the lower end of the suction or air-inlet pipe, irrespective of the level of the liquid in the flask, so that the head under which the liquid flows from the discharge opening is constant for any level of liquid above the lower end of the suction or air-inlet pipe.

In the apparatus referred to, the Mariotte flask is movable. It is an object of my invention to so design an apparatus of which a Mariotte flask forms part, that its operation is performed under more favorable and convenient conditions, and is simplified thereby.

To this end, I provide a Mariotte flask which is stationary, in combination with a discharge pipe whose outlet opening is adapted to be displaced vertically with respect to the flask, and a measuring tank for the reception of the liquid flowing from the outlet opening. Preferably, the measuring tank is connected to the discharge pipe and moves with the pipe.

The piece of material to be tested is secured to the upper end of the suction pipe so that the air which is drawn into the flask through the suction pipe to make up for the liquid discharged from the flask, permeates the test piece. If the upper end of the suction pipe is not obstructed by a test piece, the volume of make-up air which is drawn in through the suction pipe per unit of time, is equal to the volume of liquid which is discharged from the discharge pipe during the same unit, for a given head from the lower end of the suction pipe to the outlet opening of the discharge pipe. If a test piece is inserted, the flow of the make-up air is obstructed more or less, in conformity with the degree of permeability of the material under test. For a test piece of a given permeability and for a given head, the flow of the liquid from the flask generates a given reduction of pressure in the suction pipe below the test piece. The relation of the reduction of pressure below the test piece to the head of liquid from the lower end of the suction pipe to the outlet end of the discharge pipe, or to the volume of liquid discharged per unit of time which obviously is a function of the head, is a measure of the permeability of the material. If one of the two factors, the reduction of pressure or the head, is maintained constant, the variation of the other factor for a test piece of material other than the material which had been tested, is a measure of the permeability of this material, as compared with the permeability of the first material. According to my invention, the head is varied, the outlet opening of the discharge pipe being displaced vertically until the reduction of pressure (which is the constant) has become equal to the reduction under which the first test was performed, and the volume of liquid which flows from the discharge pipe under this head per unit of time say, per minute, is measured. The volume, as compared with the volume for the first test, is a measure for the variation of the head which variation, in turn, is determined by the permeability of the second test piece as compared with the permeability of the first piece. In this manner, the permeability of any material may be determined as related to the permeability of a material of known permeability.

In the drawing affixed to this specification and forming part thereof several forms of an apparatus embodying my invention are illustrated diagrammatically by way of example.

In the drawing

Fig. 1 is a partly sectional elevation of an apparatus in which the measuring tank is raised and lowered by means of a rack-and-pinion-mechanism, Fig. 2 is a diagram of an apparatus in which the measuring tank and a balance weight are attached to opposite ends of a flexible member, so that the tank is readily moved to any desired position, and Fig. 3 is a diagram of an apparatus in which the measuring tank is raised and lowered by a medium under pressure acting on a piston.

Referring now to the drawing, and first to Fig. 1, 2 is a frame which may be of cast iron, and 1 is a Mariotte flask on the frame. 3 is the suction pipe of the Mariotte flask, 4 is a casing to which the upper end of the suction pipe 3 is connected and 5 is the test piece which is extended across the open top of the casing 4 and held by suitable means, such as the ring and thumb screws illustrated. 6 is a pressure gauge connected to the casing 4, 7 is the closure of the Mariotte flask, 8 is a filling funnel with a cock 9, and 10 is an air vent, both on the closure 7.

The discharge pipe extends from the bottom of the flask 1 to the outlet end of an overflow pipe 14. 12 is a nipple at the bottom of the flask, with a cock 11. A flexible tube 13 connects the cock 11 to the lower end of the overflow pipe 14. 15 is a bracket on which the overflow pipe 14 and a measuring tank 16 are supported, the upper curved end of the overflow pipe opening above the tank 16 which receives the liquid discharged from the flask 1.

The bracket 15 is mounted upon a rack which is fitted to slide in a suitable block 32, 18 is a pinion mounted in suitable bearings of the block 32 and meshing with the rack 17, and 19 is a crank on the shaft of the pinion. It will be understood that by rotating the crank 19 the rack 17 is raised and lowered, and the head from the lower end of the suction pipe 3 to the opening of the overflow pipe 14 is varied. In the example illustrated, the head is $h_1$ in the upper position of the measuring tank shown in full lines, and $h_2$ in the lower position shown in dotted lines. The head is a function of the permeability of the test piece 5 and is varied by raising and lowering the measuring tank 16 so as to maintain a constant suction in the casing 4 which is indicated by the pressure gauge 6 and may be 4 in. of water.

As explained in the introduction, the head of liquid from the lower end of the suction pipe 3 to the outlet of the discharge opening at the upper end of the overflow pipe 14, determines the volume of liquid which is discharged from the flask 1 per unit of time. The suction in the casing 4 is the constant, and the head $h$ is the variable. For a material of minimum permeability, the head is $h_1$. For a denser material, the resistance to the flow of atmospheric air into the casing 4 is increased and a greater head is required for drawing in so much air that the constant suction in the casing 4 is re-established. The overflow pipe 14 and the measuring tank 16 are lowered until the gauge 6 again indicates the constant suction in the tank 4. The head to which the overflow pipe 14 must be lowered for re-establishing the constant suction, is a function of the permeability of the material under test but is not measured. What is measured is the volume discharged per unit of time, say, one minute, which volume obviously is a function of the variable head.

Referring now to Fig. 2, the Mariotte flask 1 and its accessories have been omitted in this and in the next figure for the sake of convenience. 33 is an upright, 21 is a sheave at the upper end of the upright, 20 is a flexible member, such as a cable or chain which is supported on the sheave 21 and secured to the bracket 15 at one end and 22 is a balance weight attached to its other end. 23 is a slide or clip on the bracket 15 which is guided on a bar 24. The slide serves not only for guiding but also for handling the bracket 15 and is equipped with a set screw 34 for holding it on the bar 24 at any desired level.

Referring now to Fig. 3, 25 is the rod of a piston 26 to the upper end of which rod the bracket 15, with the measuring tank 16, is secured. 27 is a cylinder in which the piston 26 is mounted to reciprocate, 30 is a source of supply of fluid under pressure, which may be in liquid or gaseous condition, 31 is a three-way valve, and 28, 29 are pipes extending respectively to the upper and lower ends of the cylinder for distributing the fluid from the three-way valve 31.

By arranging the Mariotte flask 1, with its suction pipe 3 and the casing 4 for the test 5, in a fixed position the reading of the pressure gauge 6 is much facilitated as the gauge 6 is invariably in the same position, preferably at the level of the operator's eyes. Another advantage of the fixed flask is that its capacity may be large since the fixed frame 2 may be made as strong as required, so that a great number of tests may be performed in series without the flask requiring refilling.

In series tests it is not necessary to return the overflow pipe 14 to its zero position after every test, but it is sufficient to effect a slight regulation of its position so as to reestablish the normal pressure, say 4 in. water, in the casing 4.

I wish it to be understood that I do not desire to be limited to the exact details of construction shown and described for obvious modifications will occur to a person skilled in the art.

I claim:—

1. An apparatus for testing the permeability of porous materials comprising a stationary Mariotte flask, a discharge pipe connected to the liquid space of said flask, means for displacing the outlet opening of said pipe vertically with respect to said flask, and a measuring tank guided for vertical reciprocation for receiving the liquid flowing from said pipe.

2. An apparatus for testing the permeability of porous materials comprising a stationary Mariotte flask, with a suction pipe, a casing for supporting the test piece connected to said suction pipe, a discharge pipe connected to the liquid space of said flask, means for displacing the outlet opening of said pipe vertically with respect to the lower end of said suction pipe, and a measuring tank for receiving the liquid flowing from said pipe.

3. An apparatus for testing the permeability of porous materials comprising a stationary Mariotte flask, with a suction pipe, a casing for supporting the test piece connected to said suction pipe, a bracket adapted to be displaced vertically with respect to the lower end of said suction pipe, a discharge pipe which is connected to the liquid space of said flask at one end and whose other or outlet end is mounted on said bracket, and a measuring tank also mounted on said bracket for receiving the liquid flowing from said pipe.

4. An apparatus for testing the permeability of porous materials comprising a stationary Mariotte flask, with a suction pipe, a casing for supporting the test piece connected to said suction pipe, a bracket adapted to be displaced vertically with respect to the lower end of said suction pipe, means for guiding said bracket in a straight vertical line, a discharge pipe which is connected to the liquid space of said flask at one end and whose other or outlet end is mounted on said bracket, and a measuring tank also mounted on said bracket for receiving the liquid flowing from said pipe.

5. An apparatus for testing the permeability of porous materials comprising a stationary Mariotte flask, with a suction pipe, a casing for supporting the test piece connected to said suction pipe, a bracket adapted to be displaced vertically with respect to the lower end of said suction pipe, a rack and pinion mechanism for raising and lowering said bracket, a discharge pipe which is connected to the liquid space of said flask at one end and whose other or outlet end is mounted on said bracket, and a measuring tank also mounted on said bracket for receiving the liquid flowing from said pipe.

6. An apparatus for testing the permeability of porous materials comprising a stationary Mariotte flask, with a suction pipe, a casing for supporting the test piece connected to said suction pipe, a bracket adapted to be displaced vertically with respect to the lower end of said suction pipe, means for fixing said bracket in a given position, a discharge pipe which is connected to the liquid space of said flask at one end and whose other or outlet end is mounted on said bracket, and a measuring tank also mounted on said bracket for receiving the liquid flowing from said pipe.

7. An apparatus for testing the permeability of porous materials comprising a stationary Mariotte flask, with a suction pipe, a casing for supporting the test piece connected to said suction pipe, a bracket adapted to be displaced vertically with respect to the lower end of said suction pipe, a fluid-controlled piston for raising and lowering said bracket, a discharge pipe which is connected to the liquid space of said flask at one end and whose other or outlet end is mounted on said bracket, and a measuring tank also mounted on said bracket for receiving the liquid flowing from said pipe.

8. An apparatus for testing the permeability of porous materials comprising a Mariotte flask, with a suction pipe, a casing for supporting the test piece connected to said suction pipe, means for holding said flask in a fixed position, a measuring tank adapted to be raised and lowered, a pipe line extending from the liquid space of said flask to said tank, a flexible member operatively connected to said measuring tank at one end, a sheave supporting said member, and a balance weight at the other end of said member.

9. An apparatus for testing the permeability of porous materials comprising a Mariotte flask, with a suction pipe, a casing for supporting the test piece connected to said suction pipe, means for holding said flask in a fixed position, a measuring tank adapted to be raised and lowered, a pipe line extending from the liquid space of said flask to said tank, and means including a set screw for fixing said tank in a given position.

10. An apparatus for testing the permeability of porous materials comprising a Mariotte flask, with a suction pipe, a casing for supporting the test piece connected to said suction pipe, means for holding said flask in a fixed position, a bracket adapted to be raised and lowered, a measuring tank arranged on said bracket and a pipe line extending from the liquid space of said flask to said tank, a fixed bar, and a clip on said bracket mounted to slide on said bar, and adapted to be held in any given position thereon.

11. An apparatus for testing the permeability of porous materials comprising a Mariotte flask, with a suction pipe, a casing for supporting the test piece connected to said suction pipe, means for holding said flask in a fixed position, a measuring tank adapted to be raised and lowered, and a pipe line including a curved overflow pipe extending from the liquid space of said flask to said tank.

RUDOLF SCHOPPER.